Patented May 3, 1949

2,468,952

UNITED STATES PATENT OFFICE 2,468,952

PROCESS FOR THE PREPARATION OF DI-THIAZYL DISULFIDE

Adolph J. Beber, Copley, Ohio, assignor to The B. F. Goodrich Company, New York, N. Y., a corporation of New York No Drawing. Application December 12, 1944, Serial No. 567,895

6 Claims. (Cl. 260—306.5)

This invention relates to an improved process for the preparation of dithiazyl disulphides, and has specific reference to the oxidation of mercaptothiazoles of the general formula:

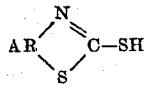

where AR is a bivalent aromatic radical having its valence bonds on adjacent ring carbon atoms, to the corresponding disulphides.

The objects of this invention are the manufacture of those dithiazyl disulphides of high purity, in good yields and at an economical cost.

In the preparation of these dithiazyl disulphides, some of which are widely used as accelerators for the vulcanization of rubbers, from the corresponding 2-mercaptothiazoles, a hydrogen atom is split off from the sulfhydryl group of each of two molecules of the corresponding mercapto compounds by means of an oxidizing agent, and the two molecules unite to form the disulphide.

Various methods of oxidizing the mercapto compounds have been proposed and used, among them being methods of oxidizing slurries of the mercapto compounds with peroxides, persulfates and permanganates at temperatures near and at the boiling point of the reaction mixture. These methods are subject to the disadvantage that the oxidizing agents are comparatively expensive and attempts have been made to replace them by less expensive oxidants.

According to my invention, chlorine is used as the oxidizing agent in the process for the preparation of these dithiazyl disulphides from their corresponding 2-mercaptothiazoles. The use of chlorine as an oxidizing agent for this process has been considered objectionable in the past, because the prior methods employed various solvents to dissolve the mercapto compounds to obtain greater contact between the mercapto compound and the chlorine.

The preferred method of practicing this invention consists of forming the sodium salt of the mercapto compound and forming the disulphide compound by oxidizing the sodium salt of the mercapto compound with chlorine at moderate temperatures and in an aqueous alkaline medium, according to the reactions illustrated by the following equations:

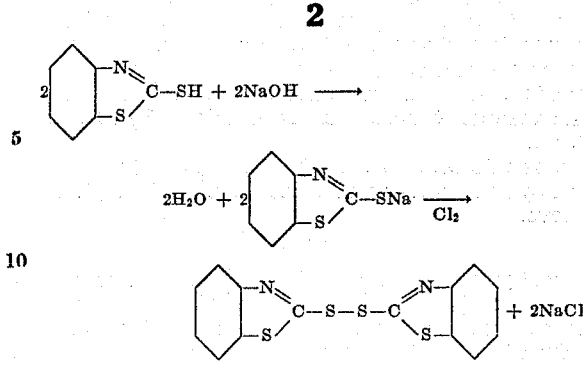

The disulphide being highly insoluble in water, precipitates and is easily recovered by filtration and washed free of the water-soluble common salt formed as by-product.

While water is employed as the diluent in the embodiment of the process just described, organic solvents may also be used. In general, mercaptothiazoles are appreciably soluble in organic solvents while the dithiazyl disulphides are even more soluble. The process would therefore become somewhat more involved and, in addition, would require recovery of the oxidation product from solution as well as recovery of the organic solvent. This modification accordingly appears to be less desirable than that in which a water medium is used.

The use of an oxidation catalyst is not necessary in this process. Chlorine is an oxidizing agent that may be used at low to moderate temperatures which is, in general, desirable, for the cost of manufacturing can be reduced by not having to discard the heat that has been put into the reaction medium as in the case of oxidation at or near the boiling point of the medium.

2-mercaptothiazoles that may be oxidized to their corresponding disulphides by my process, include, among others, 2-mercaptonapthothiazole, 2-mercapto-4-phenyl benzothiazole, 2-mercapto-5-nitro benzothiazole, 2-mercapto-6-chlor benzothiazole, 2-mercapto-5-chlor benzothiazole, 2-mercapto-6-nitro benzothiazole, 2-mercapto-6-ethoxy benzothiazole, and 2-mercapto-alkyl-benzothiazoles.

For products of high purity, in good yields and at an economical cost, it is advantageous to control the reaction conditions within certain limits.

If the reaction medium becomes acid during the oxidation, the product formed is low in purity and in yield, but when the pH of the reaction mixture is maintained at 8 or above, products of high purity and yields are obtained with the same amount of reactants. The alkalinity of the reaction medium may be controlled by adding a water-soluble salt of a strong base and a weak acid such as sodium carbonate, sodium acetate, sodium bicarbonate, etc. that will in effect buffer the reaction medium while the chlorine is being added and thereby maintain an alkaline reaction medium. It is also possible to control the alkalinity of the reaction medium by adding an alkali metal hydroxide, such as sodium hydroxide, during the oxidation period. The most satisfactory way to accomplish this is to add a solution containing sodium hydroxide at such a rate as will be sufficient to maintain a pH of not less than 9.

It is also desirable to maintain the reaction temperature between certain limits to obtain maximum yields. When a buffering material such as sodium carbonate is used, yields of 90% or better are obtained when the reaction temperature is maintained at about 50 to 70° C. When sodium hydroxide is used to maintain an alkaline reaction medium, yields of 95 to 100% are obtained when the reaction temperature is maintained at 30 to 35° C.

The following are specific examples of my invention and will demonstrate the procedure given above.

*Example I*

34.6 grams of 2-mercapto benzothiazole, which is slightly in excess of 0.2 molecular equivalent to compensate for impurities present, are dissolved in 200 ml. of water containing 18.5 grams of 48% sodium hydroxide (0.222 molecular equivalent of sodium hydroxide). 10.6 grams (0.1 molecular equivalent) of sodium carbonate dissolved in 100 ml. of water are added to the sodium mercaptide solution, and any insoluble material is filtered off. The weight of alkali-insoluble material in this case is 1.3 grams. The filtrate is then heated to 50° C. and chlorine is bubbled into the solution while constantly stirring the reaction mixture. The rate of addition of chlorine is such that none escapes to the atmosphere.

The white precipitate which forms is the di-(benzothiazyl) disulfide. When the reaction is complete, which can be determined by filtering off part of the reaction medium and precipitating any unoxidized mercapto benzothiazole by the addition of an acid, the chlorine is shut off and the disulphide is recovered from the reaction mixture by filtration. The filtrate is still alkaline with a pH of about 8. The filter cake is washed free of the sodium chloride by-product salt and then dried. After drying, the disulphide thus formed weighs 29.7 grams representing an 89.4% yield based on the weight of 2-mercapto benzothiazole used or 92.3% based on the weight of alkali-soluble 2-mercapto benzothiazole. The melting point of the product is 161–164° C.

*Example II*

167 grams of 2-mercapto benzothiazole are dissolved in 2000 ml. of water containing 40 grams of sodium hydroxide. The pH of this solution is then adjusted to 10 by the addition of concentrated sulfuric acid. The solution is filtered as before and the alkali-insoluble material weighs 9.6 grams when dried. The alkaline filtrate is warmed to 30° C. and chlorine is then bubbled in slowly with continuous vigorous stirring. Chlorine is added as rapidly as possible without allowing any to escape from the reaction mixture. The addition of chlorine on this scale takes about 2 hours. The variations of the pH of the reaction medium is followed by a pH meter using a lithium-glass electrode and without correcting the readings for the sodium ion concentration. The pH is maintained substantially constant at about 10 by the dropwise addition of about 18 ml. of a solution containing 48% sodium hydroxide. The finely divided white precipitate that forms is di-(benzothiazyl) disulphide which is isolated from the reaction medium by filtration. The sodium chloride by-product formed and any residual sodium hydroxide are washed from the filter cake with water. After drying, the disulphide thus formed weighs 152.2 grams representing a yield of 96.8% based on the alkali-soluble 2-mercapto benzothiazole and 92% based on the 2-mercapto benzothiazole used. The melting point of the product is 166–172° C.

While I have herein disclosed certain preferred manners of performing my invention, I do not thereby desire or intend to limit myself solely thereto, for as hitherto stated, the precise portions of the materials utilized may be varied and other materials having equivalent chemical properties may be employed if desired without departing from the spirit and scope of the invention as defined in the appended claims.

I claim:

1. A process for preparing a dithiazyl disulphide which comprises preparing an alkaline solution of the sodium salt of the corresponding 2-mercaptothiazole of the general formula:

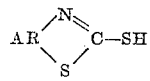

where AR is a bivalent aromatic radical having its valence bonds on adjacent ring carbon atoms, oxidizing said thiazole salt at a temperature of 30° C. to about 70° C. by bubbling chlorine into the solution while maintaining its alkalinity at a pH between about 8 and about 11 until the oxidation is complete; whereby the disulphide is formed as a precipitate, and isolating the disulphide from the reaction medium.

2. A process for preparing di-(benzothiazyl) disulphide which comprises preparing an alkaline solution of the sodium salt of 2-mercapto benzothiazole, oxidizing said thiazole salt at a temperature of 30° C. to about 70° C. by bubbling chlorine into the solution while maintaining its alkalinity at a pH between about 8 and about 11 until the oxidation is complete; whereby the disulphide is formed as a precipitate, and isolating the disulphide from the reaction medium.

3. A process for preparing di-(benzothiazyl) disulphide which comprises preparing an alkaline solution of the sodium salt of 2-mercapto benzothiazole, oxidizing said thiazole salt by bubbling chlorine into the alkaline solution until the oxidation is complete, maintaining the alkalinity of the reaction medium at a pH between about 8 and about 11 by the addition of a water-soluble salt of a strong base and a weak acid, maintaining the reaction temperature at substantially 50° C. to 70° C.; whereby the disulphide is formed as a precipitate, and isolating the precipitate from the reaction medium.

4. A process for preparing di-(benzothiazyl) disulphide which comprises preparing an alkaline solution of the sodium salt of 2-mercapto benzothiazole, oxidizing said thiazole salt by bubbling chlorine into the alkaline solution until the oxidation is complete, maintaining the pH of the reaction medium between about 8 and 11 by the addition of an alkali metal hydroxide, maintaining the reaction temperature at substantially 30° C. to about 50° C.; whereby the disulphide is formed as a precipitate, and isolating the disulphide from the reaction medium.

5. A process for preparing di-(benzothiazyl) disulphide which comprises preparing an alkaline solution of the sodium salt of 2-mercapto benzothiazole, oxidizing said thiazole salt by bubbling chlorine into the alkaline solution until the oxidation is complete, maintaining the alkalinity of the solution at a pH between about 8 and 11 by the addition of substantially one molecular equivalent of sodium carbonate for each two molecular equivalents of thiazole, maintaining the reaction temperature at substantially 50° C.; whereby the disulphide is formed as a precipitate, and isolating the disulphide from the reaction medium.

6. A process for preparing di-(benzothiazyl) disulphide which comprises preparing an alkaline solution of the sodium salt of 2-mercapto benzothiazole, oxidizing said thiazole salt by bubbling chlorine into the alkaline solution until the oxidation is complete, maintaining the pH of the reaction medium at substantially 10 by the continuous addition of sodium hydroxide during the period of oxidation, maintaining the reaction temperature at substantially 30 to 35° C.; whereby the disulphide is formed as a precipitate, and isolating the disulphide from the reaction medium.

ADOLPH J. BEBER.

REFERENCES CITED

The following references are of record in the file of this patent:

UNITED STATES PATENTS

| Number | Name | Date |
| --- | --- | --- |
| 1,970,065 | Tomlinson | Aug. 14, 1934 |
| 2,196,607 | Mathes | Apr. 9, 1940 |
| 2,265,347 | Carr | Dec. 9, 1941 |
| 2,304,426 | Sibley | Dec. 8, 1942 |
| 2,349,599 | Moorhouse | May 23, 1944 |
| 2,375,083 | Cooper | May 1, 1945 |